(12) United States Patent
Michel et al.

(10) Patent No.: US 8,153,734 B2
(45) Date of Patent: Apr. 10, 2012

(54) PROCESS FOR PREPARING A POLYETHYLENE RESIN IN A DOUBLE LOOP REACTOR WITH A MIXTURE OF BIS-INDENYL AND BIS-TETRAHYDROINDENYL

(75) Inventors: Jacques Michel, Feluy (BE); Martine Slawinski, Nivelles (BE); Guy Debras, Frasnes-lez-Gosselies (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/741,445

(22) PCT Filed: Nov. 4, 2008

(86) PCT No.: PCT/EP2008/064944
§ 371 (c)(1),
(2), (4) Date: Sep. 13, 2010

(87) PCT Pub. No.: WO2009/059971
PCT Pub. Date: May 14, 2009

(65) Prior Publication Data
US 2011/0015353 A1 Jan. 20, 2011

(30) Foreign Application Priority Data
Nov. 6, 2007 (EP) .................................... 07120089

(51) Int. Cl.
C08F 2/00 (2006.01)
C08F 2/12 (2006.01)
C08F 4/646 (2006.01)
(52) U.S. Cl. .......... 526/64; 526/65; 526/119; 526/352.2
(58) Field of Classification Search .................... 526/64, 526/119, 352, 65, 352.2
See application file for complete search history.

(56) References Cited

U.S. PATENT DOCUMENTS

2002/0065368 A1 5/2002 Debras
2003/0195306 A1 10/2003 Tsuie
2005/0065298 A1 3/2005 Dekmezian

FOREIGN PATENT DOCUMENTS

EP 1674504 6/2006
WO WO 97/44371 11/1997
WO WO 2006/114210 11/2006

OTHER PUBLICATIONS

Yin et al, Geomembranes (Educational Research), 2001, Apparel Search Co., 13 pages.*

* cited by examiner

Primary Examiner — Fred M Teskin

(57) ABSTRACT

The present invention discloses a process for preparing polyethylene resins in a double loop reactor wherein the catalyst system comprises a bis-tetrahydroindenyl and a bis-indenyl catalyst component deposited on the same support. It also discloses the polyethylene resins obtained by the process and their use to prepare films having a good compromise of haze, processing and mechanical properties.

9 Claims, 4 Drawing Sheets

PROCESS FOR PREPARING A POLYETHYLENE RESIN IN A DOUBLE LOOP REACTOR WITH A MIXTURE OF BIS-INDENYL AND BIS-TETRAHYDROINDENYL

CROSS-REFERENCE TO RELATED APPLICATIONS

This application claims the benefit of PCT/EP20081064944, filed Nov. 4, 2908, which claims priority from EP 07120089.3, filed Nov. 6, 2007.

This invention relates to the preparation of polyethylene resins with a catalyst system comprising a blend of bisindenyl and bistetrahydroindenyl catalyst components. The resulting polyethylene resins have a unique rheological behaviour that makes them suitable for preparing films.

Many prior art documents relate to the production of polyethylene resins and to films prepared therefrom. In particular films prepared from metallocene PE resins are endowed with excellent mechanical and optical properties. However, there is a counterpart as processing of those resins in extruders is often very poor. Processing can be improved by increasing the molecular weight distribution or by incorporating long chain branching (LCB) during synthesis or by blending with low-density polyethylenes (LDPE). However the trade-off is often at the expense of optical and mechanical properties. Another drawback of most metallocene PE resins is that polymer-processing aids (PPA) should be added to avoid melt fracture phenomena during extrusion.

Amongst metallocene PE resins known to contain LCB, one can cite those produced with bis-indenyl catalysts. Polyethylene resins prepared with bis-indenyl catalyst systems are known to share several characteristics with low-density polyethylene resins, including their easy processing capability. This behaviour has been described for example in WO90/07526 or in Matsuo et al. (Matsuo S., Kojoh S.-I., Takahashi M., Tsutsui T., Fujita T., Kashiwa N., 'Studies on rheological properties of polyolefins prepared with metallocene catalyst systems.' In polymer Materials Sciences and Engineering, 84, 769, 2001.) or in EP-A-676421, or in WO99/35174. However, as will be seen below, there is still a gap between the processing-ease of LDPE and that of bis-indenyl mPE resins.

The properties of polyethylene resins prepared with bis-indenyl catalyst systems, particularly in terms of long chain branching, are described for example in Walter et al. (Walter P., Heinemann J., Ebeling H., Mader D., Trinkle S., and Mulhaupt R., in Organomet. Catal. Olefin Polym. 317-326, edited by Richard Blom, Springer-Verlag, Berlin, 2001.) or in Kokko (Kokko E., metallocene-catalyzed ethane polymerization:long-chained branched PE, Acta Polytechnica Scandinavia, Chemical technology Series, 290, 1, 2002.) or in Gabriel et al. (Gabriel C., Kokko E., Lofgren B., Seppala J., and Münstedt H., in Polymer, 43, 6383, 2002.) or in Yu et al. (Yu Y., Rohlfing D. C., Hawley G. R. and DesLauriers P. J., 'LCB in metallocene-catalyzed PE determined by a combination of SEC/MALS, NMR and rheology, in Polymer Preprints, 44(2), 49, 2003.)

The present applicant has also observed good processing for polyethylene resins prepared from a combination of a bridged bis-indenyl catalyst component and an unbridged metallocene catalyst component. These resins exhibit a marked bimodal molecular weight distribution and excellent processing as reported for example in EP-A-619325 or in Everaert (Everaert J., 'New polyethylene grades in a loop slurry process', in Metallocene 1996, Proc. Int. Congr., Metallocene Polym. $2^{nd}$, 97 Schotland Business Research: Skilman, N.J. 1996, and Everaert J., Kunststoffe, 87, 73, 1997.) In these articles, the presence of long chain branching is linked to increased shear response defined as the ratio of melt indexes HLMI to MI2, wherein melt indexes HLMI and MI2 are determined according to the method of ASTM D-1238 condition E at a temperature of 190° C. and respectively under loads of 21.6 kg and 2.16 kg.

Bis-tetrahydroindenyl catalyst systems have also been used to prepare polyethylene resins because of their good response to hydrogen and their good ability to incorporate comonomers. They can be used to prepare resins having a bimodal molecular weight distribution and suitable for the preparation of pipes. They produce polyethylene with very low level of long chain branching, barely detectable by conventional detection methods such as size exclusion chromatography coupled with on-line viscometer detector (SEC-VISCO) or such as $^{13}$C NMR for homopolymers. However, the few LCB structures are highly efficient in increasing zero-shear viscosity. Thus presence and quantification of LCB in THI mPE is mainly inferred by rheology.

Catalyst systems based on a combination of constrained geometry catalyst component and bis-indenyl catalyst component produce polyethylene resins having enhanced formation of long chain branching as observed by Beigzadeh (Beigzadeh D., Soares J. B. P., and Duever T. A., Macromol. Symp., 173, 19, 2001.). Using a 50/50 mixture of constrained geometry component and bis-indenyl component led to a four-fold increase in long chain branching (LCB) with respect to a single constrained geometry catalyst system.

WO03/033554 discloses unblended polyethylene resins prepared from linear low density polyethylene. They have relatively high melt flow ratio and relatively high melt strength and are prepared from a mixed metallocene catalyst system comprising a dimethylsilyl-bridged bis-indenyl zirconocene dichloride wherein the indenyl is saturated and a dimethylsilyl-bridged bis-indenyl zirconocene dichloride wherein the indenyl is unsaturated. According to the inventors, for an MI2 of 0.7 dg/min the resins exhibit a value of SR (the ratio of HLMI to MI2) in the range of 40 to 90. J. Everaert, in the references cited hereabove, has also reported such high SR values. For example, a SR of 68 for a resin having a melt flow index MI2 of 0.6 dg/min.

Finally, some PE resins other than LDPE can see their processing-ease influenced by thermomechanical history. Shear modification or shear refining effects on rheology of LDPE are reported, for example, by Kim et al. (Youn Cheol Kim, Kyioung Sun Yang, Chang-Hyun Choi, 'Study of the relationship between shear modification and melt fracture in extrusion of LDPE', J. Appl. Polym. Sci. 70, 2187, 1998). Shear modification can cause disentanglement of LDPE chains and hence favour extrusion-ease with drop of extrusion head pressure and reduction of surface defects during extrusion. For some LLDPE resins, reminiscence of this phenomenon has been observed but to a lower scale. For example, U.S. Pat. No. 6,171,993 discloses an ethylene copolymer resin having good melt elastic properties. When the copolymer is pelletised, its melt elasticity (ER), that is proportional to the storage modulus, is reduced by at least 10% to a final value of at most 1.0 upon rheometric low shear modification or solution-dissolution. Such polyethylene resin can be used to prepare high impact strength films.

There is however still a need for resins that can be processed easily and offer simultaneously good optical and good mechanical properties.

LIST OF FIGURES

FIG. 1 represents the molecular weight distribution of a resin prepared with an ethylene-bis-indenyl zirconium dichloride catalyst system and a resin prepared with a catalyst system based on a 65/35 blend of ethylene-bis-tetrahydroindenyl zirconium dichloride to ethylene-bis-indenyl zirconium dichloride.

FIG. 2 represents dynamic flow curves of several polyethylene resins. The dynamic flow η* expressed in Pa·s is graphed as a function of shear rate W expressed in rad/s. The symbols for the various polyethylene resins are as follows:

nBuCP is prepared with a catalyst system based on bis(n-butyl-cyclopentadienyl) zirconium dichloride and has a melt flow index MI2 of 0.5 dg/min, a weight average molecular weight Mw of 120 kDa and a polydispersity index D of 2.6;

ZN is prepared with a Ziegler-Natta catalyst system and has MI2 of 0.9 dg/min, Mw of 118 kDa and D of 5.2;

THI is prepared with a catalyst system based on ethylene bis tetrahydroindenyl zirconium dichloride and has MI2 of 0.9 dg/min, Mw of 83 kDa, and D of 2.6;

EBI is prepared with a catalyst system based on ethylene bisindenyl zirconium dichloride and has MI2 of 0.55 dg/min, Mw of 139 kDa, and D of 6;

Cr is prepared with a chromium-based catalyst system and has MI2 of 0.63 dg/min, Mw of 125 kDa, and D of 7.4;

EBI/THI are resins R2 (○) and R1 (◇) prepared according to the present invention;

LDPE is a low density polyethylene resin prepared by high pressure method and has MI2 of 0.9 dg/min.

FIG. 3 represents the mechanical energy expressed in kWh/kg as a function of the percentage of EBI present in the catalyst mixture. Resins obtained with 17.5% EBI were obtained by melt extrusion of THI and 65/35 THI/EBI resins.

FIG. 4 illustrates the processing window defined in terms of extruder head pressure and of melt strength, at a shear rate of 500 s⁻1, and 190° C. melt temperature. Several polyethylene resins are compared including EBI/THI resins, other mPE resins, Ziegler-Natta bimodal PE resins, chromium-based PE resins and LDPE. The addition of polymer processing aid (PPA) to resins prepared with THI produces a decrease in extruder head pressure and an increase in melt strength because of the disappearance of incipient melt fracture, as shown on the figure by an arrow.

Figure 1:
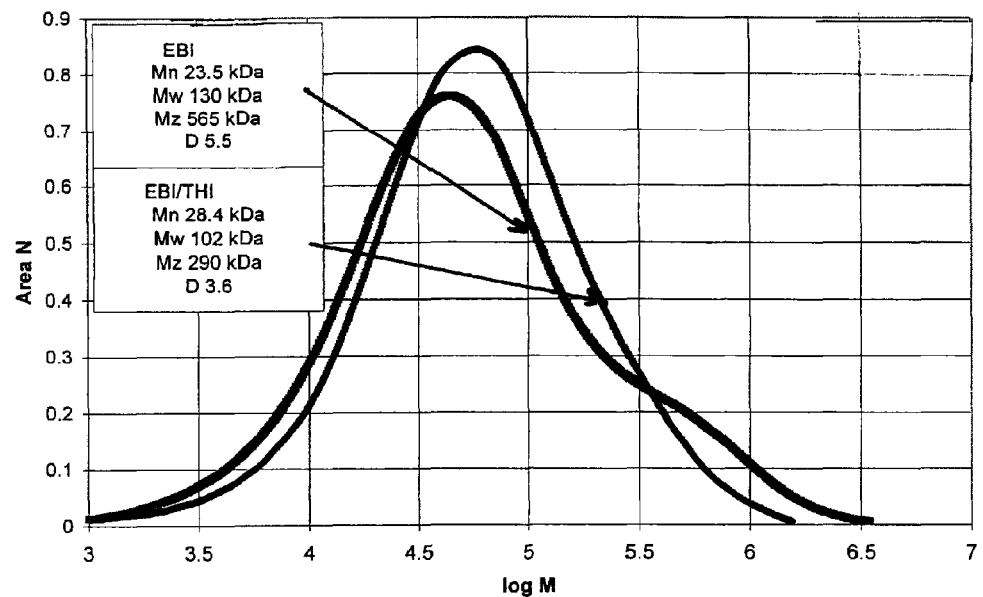

It is an aim of the present invention to prepare polyethylene resins that can be processed easily.

It is also an aim of the present invention to prepare polyethylene resins that have good optical properties.

It is another aim of the present invention to prepare polyethylene resins that have good mechanical properties.

It is a further aim of the present invention to prepare polyethylene resins having good melt strength.

It is yet a further aim of the present invention to prepare blown films having good machine and transverse Elmendorf tear.

It is yet another aim of the present invention to prepare blown films having good tensile properties.

It is also an aim of the present invention to prepare blown film having puncture resistance.

Any one of these aims is at least partially fulfilled by the present invention.

Accordingly the present invention discloses a process for preparing polyethylene resins resin in a double loop reactor, that comprises the steps of:

a) injecting into the first reactor an activated supported catalyst system wherein the catalyst component consists of from 25 to 55 wt % of a first bisindenyl catalyst component and from 45 to 75 wt % of a second bistetrahydroindenyl catalyst component;

b) injecting ethylene monomer and optional comonomer into the first reactor simultaneously with or after the catalyst system of step a);

c) maintaining under polymerisation conditions in the first reactor;

d) transferring the catalyst system and polymer into the second reactor and injecting fresh monomer and the same optional comonomer;

e) maintaining, in the second reactor, the same polymerisation conditions as in the first reactor;

f) retrieving a polyethylene resin wherein the level of long chain branches increases when passing from the first to the second reactor.

It also discloses a polyethylene resin obtainable by the process of the invention.

It further discloses blown films prepared with the polyethylene resin of the present invention.

In the present description, as the two reactors are operated with the same polymerisation conditions, the double loop reactor is said to be operated in "monomodal configuration".

The bis-indenyl catalyst component is represented by formula I

wherein
Ind is substituted or unsubstituted indenyl;
R" is a structural bridge between the two indenyls to impart stereorigidity that comprises a $C_1$-$C_4$ alkylene radical, a dialkyl germanium or silicon or siloxane, or a alkyl phosphine or amine radical, which bridge is substituted or unsubstituted;
M is a metal Group 4 of the Periodic Table; and
Q is hydrogen, halogen, hydrocarbyl or hydrocarboxyl.

In formula (I), each indenyl group may be substituted in the same way or differently from one another at one or more positions in the cyclopentadienyl ring, the cyclohexenyl ring and the bridge.

In formula (I), each substituent on the indenyl may be independently chosen from those of formula $XR_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

Preferably, if present, the substituents on the indenyl groups are in positions 2 and/or position 4 with a small substituent, such as methyl, at position 2 and a bulky substituent, such as t-butyl or phenyl, at position 4. More preferably, the indenyl groups are unsubstituted.

Preferably, the bridge is a C1-C4 alkylene radical more preferably selected from $Me_2C$, $Ph_2C$ or a silyl bridge more preferably $Me_2Si$. The most preferred bridge is $Me_2C$.

Preferably M is selected from Zr, Ti, Hf or V. More preferably it is Zr.

Each Q is the same or different and may be a hydrocarbyl or hydrocarboxyl radical having 1 to 20 carbon atoms or a halogen. Suitable hydrocarbyls include aryl, alkyl, alkenyl, alkylaryl or arylalkyl. Both Q are preferably the same and halogen, more preferably chlorine.

The most preferred bis-indenyl component is ethylene-bis-indenyl zirconium dichloride.

The hydrogenated bis-indenyl catalyst component is represented by formula

wherein
(H$_4$Ind) is a hydrogenated indenyl group substituted or unsubstituted and the other quantities are as described hereabove.

Preferably, the hydrogenated indenyl groups are unsubstituted and the most preferred component is ethylene-bis-tetrahydroindenyl zirconium dichloride.

The amount of bis-indenyl component is of from 25 to 55 wt %, preferably of from 40 to 55 wt % and more preferably of about 50 wt % and the amount of bis-tetrahydroindenyl component is of from 45 to 75 wt %, preferably of 45 to 60 wt % and more preferably of about 50 wt %.

The two catalyst components are preferably deposited on a support, according to any method known in the art. In the event it is supported, the support used in the present invention can be any organic or inorganic solid. Preferably it is a porous support such as talc or inorganic oxide, or a resinous support material such as polyolefin. Preferably, the support material is an inorganic oxide in its finely divided form.

The addition on the support, of an agent that reacts with the support and has an ionising action, creates an active catalyst system.

Aluminoxane is preferably used to ionise the catalyst components during the polymerisation procedure. Any aluminoxane known in the art is suitable.

The preferred aluminoxanes comprise oligomeric linear and/or cyclic alkyl aluminoxanes represented by the formula:

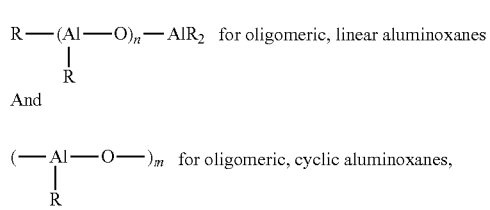

wherein n is 1-40, preferably 10-20, m is 3-40, preferably 3-20 and R is a C$_1$-C$_8$ alkyl group and preferably methyl.

Methylaluminoxane (MAO) is preferably used.

Alternatively, boron-containing activating agents may be used.

One or more aluminiumalkyl(s) can be used as scavenger in the reactor. An aluminiumalkyl represented by the formula AlR$_3$ can be used wherein each R is the same or different and is selected from halides or from alkoxy or alkyl groups having from 1 to 12 carbon atoms. Especially suitable aluminiumalkyl is trialkylaluminium, the most preferred being triisobutylaluminium (TIBAL).

Fluorinated activating supports, as described in WO 2005/075525, can also be used to activate the catalyst components.

Further, the catalyst may be prepolymerised prior to being introduced in the reaction zone and/or prior to the stabilisation of the reaction conditions in the reactor.

A double loop reactor is used to produce the resin of the invention consisting of a first fraction produced in the first reactor under first polymerisation conditions and a second fraction produced in the second reactor under the same polymerisation conditions.

The polymerisation temperature ranges from 20 to 125° C., preferably from 60 to 95° C. and the pressure ranges from 0.1 to 5.6 MPa, preferably from 2 to 4 MPa, for a time ranging from 10 minutes to 4 hours, preferably from 1 and 2.5 hours.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The density of the polyethylene is regulated by the amount of comonomer injected into the reactor; examples of comonomer which can be used include 1-olefins, typically C3 to C20 olefins among which propylene, butene, hexene, octene, 4-methyl-pentene are preferred, the most preferred being hexene.

The polyethylene structure is mainly influenced by the catalytic system used for polymerisation and said structure is responsible for the properties of the final articles. The molecular weight distribution (MWD) is completely defined by the polydispersity index PI that is the ratio Mw/Mn of the weight average molecular weight (Mw) to the number average molecular weight (Mn).

Throughout this description, long chain branching (LCB) means chains long enough for entanglements to occur.

The resins of the invention exhibit rheological features that can be attributed to the presence of long chain branching. Amongst those features, one can cite
- an exceptional enhancement of low shear rate viscosity with respect to linear polyethylene. This includes extrapolated zero-shear rate viscosity at a given weight-average molecular weight;
- high melt strength for a given shear viscosity
- high pseudo-plastic character represented by high shear thinning as translated by a high ratio of viscosity between low and high shear viscosity.

At the same time, the polyethylene resins of this invention have negligible amount of long chain branching as detected by classical solution techniques such as size exclusion chromatography combined with on-line viscosity detector. The average weight ratio of intrinsic viscosity of branched to linear macromolecules g' is above 0.8 and close to one.

The resins of the present invention preferably have a density of from 0.915 to 0.965 g/cm$^3$, more preferably of from 0.920 to 0.935 g/cm$^3$. The density is measured following the method of standard test ASTM 1505 at a temperature of 23° C. They have a melt index MI2 of from 0.1 to 10 dg/min, preferably of from 0.2 to 2.5 dg/min, more preferably of from 0.2 to 2 dg/min and a high load melt index HLMI of from 10 to 150 dg/min, preferably of from 15 to 100 dg/min and more preferably of from 20 to 60 dg/min. The melt index MI2 and the high load index HLMI are measured following the method of standard test ASTM D 1238 respectively under a load of 2.16 kg and 21.6 kg and at a temperature of 190° C. The resins further have a ratio HLMI/MI2 preferably in the range of from 28 to 70, more preferably of from 30 to 50.

The molecular weight distribution is represented by the polydispersity index PI. It is of less than 6 for the resins of the present invention, preferably of from 2.5 to 4. It has been observed by the present inventors that polyethylene resins prepared with ethylene-bis-indenyl-based (EBI) catalyst system exhibit a high molecular weight shoulder that contains a large amount of long chain branching. The blends of the present invention surprisingly do not exhibit any high molecular weight shoulder: there is a strong reduction of the high molecular weight tail end, concomitant with a reduction of the low molecular weight species. The molecular weight distribution resembles that of the bis-tetrahydroindenyl-based (THI) resin. This can be seen in FIG. 1 representing respectively the molecular weight distribution of a pure EBI-based resin and of a resin prepared according to the present invention.

The long chain branching factor $g_{rheo}$ is defined here-below. For the present resin, it is typically of less than 0.6, indicating the presence of long chain branching. A $g_{rheo}$ of less than 1 indicates the presence of long chain branching, the value of $g_{rheo}$ decreasing with increasing long chain branching. The long chain branching is generally given in terms of long chain branching index (LCBI), which increases with increasing long chain branching, LCBI being less accurate than $g_{rheo}$. A $g_{rheo}$ of less than 0.6 corresponds to a LCBI of at least 0.7.

Figure 2:
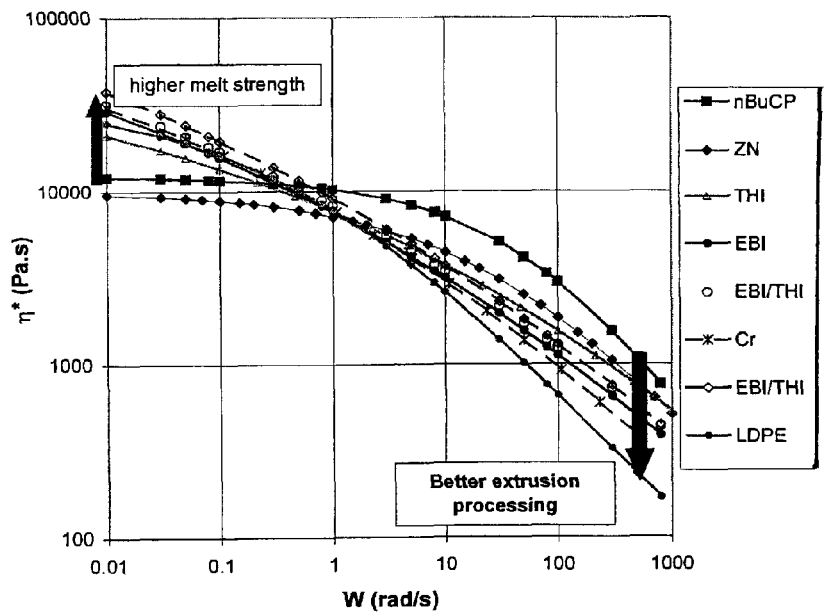

It is also observed that the resins according to the present invention exhibit shear thinning at high shear rate that resembles that of pure EBI resins. Their shear thinning behaviour is close to that of chromium-based resins. LDPE resins however exhibit more shear thinning at high shear rate than the present resins. This can be seen on FIG. 2 that represents dynamic flow curves for several resins. The resins of the present invention have a high shear viscosity at low shear rates together with a very high slope in the observed range of shear rates, indicative of high melt strength and easy extrusion.

The resins of the present invention have a smaller concentration in long chain branching than pure EBI-based resins and said concentration decreases with increasing amount of THI in the EBI/THI blend of catalyst components. It is also observed that shear history changes the topological features of long chain branching and entanglement density. Consequently it influences processing such as for example die swell, melt flow index MFI, melt strength MS and optical properties of the films made thereof.

The MI2 and HLMI melt flows of the present resins decrease strongly between the first and the second reactor whereas the HLMI/MI2 ratio increases. The molecular weights remain unchanged between reactors as well as the amount of short chain branching indicating that the loop reactors are operated in "monomodal" configuration.

The resins of the present invention have a very small die swell: it is smaller than that of resins prepared with chromium or Ziegler-Natta catalyst systems. In addition, it is inversely correlated to the amount of long chain branching. Quite surprisingly, die swell also decreases with increasing HLMI/MI2 ratio.

During extrusion and granulation, the specific mechanical energy SE is a function of torque and extruder head pressure and can be represented by $$SE = \frac{(\text{kW motor})(\varepsilon)(\text{Torque})(RPM)}{(\text{Torque})_{max}(RPM)_{max}}$$

wherein SE is expressed in kWh/kg, kWmotor is the power of the motor and is about 20.76 kW, $\varepsilon$ is an efficiency factor of about 0.954, $(RPM)_{max}$ is about 250 and $(Torque)_{max}$ is about 200 N/m.

Alternatively, for THI and THI/EBI resins, SE can be expressed in terms of melt index MI2 and SR defined as the ratio of HLMI to MI2. SE increases with decreasing MI2 for all resins but it increases more steeply with pure THI-based resins than for the resins of the present invention prepared from various blends of EBI and THI catalyst components. The increase in mechanical energy with decreasing MI2 gets sharper when the amount of THI in the blend increases.

Figure 3:
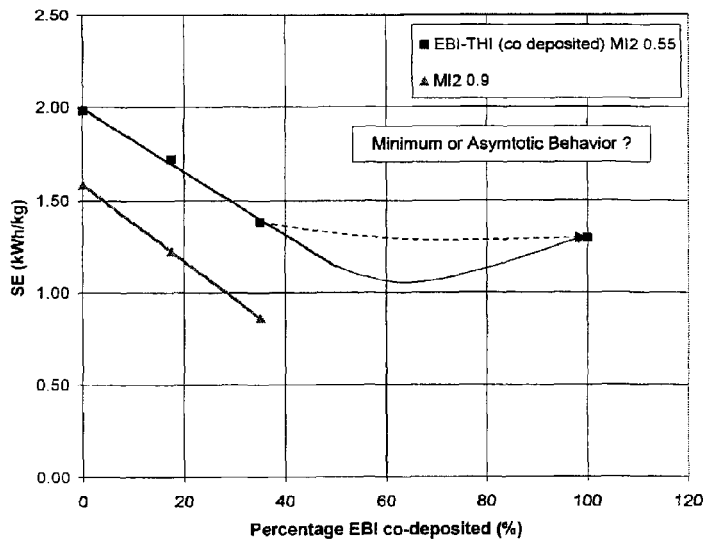

In addition, mechanical energy decreases with increasing amount of ethylene-bis-indenyl catalyst component in the blend. This can be seen on FIG. 3 representing mechanical energy SE as a function of percentage of EBI in the blend.

Figure 4:
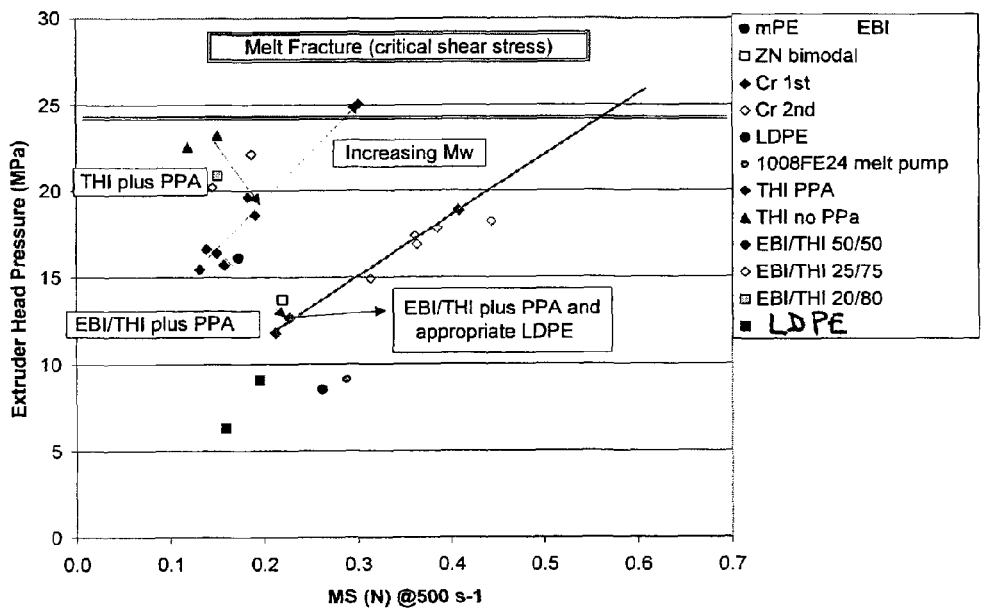

The processing window is typically expressed in terms of extruder head pressure and melt strength. It is desirable to prepare resins that have a low extruder head pressure and a high melt strength, knowing that the extruder head pressure increases with increasing melt strength at a given shear rate. Chromium-based resins and bimodal Ziegler-Natta resins are known to offer an excellent compromise as compared to THI-based resins that have a relatively high extruder head pressure and low melt strength. It is now observed that the resins according to the present invention have a much more favourable behaviour than THI based resins. This can be seen on FIG. 4. This behaviour can further be improved by adding processing aid.

Maximum Blow Up Ratio (BUR) and bubble stability increase with increasing amount of EBI in the THI/EBI blends of catalyst components.

The resins of the present invention are primarily used for the preparation of films, preferably blown films.

The mechanical properties of the films according to the invention are excellent.

The tensile tests show that the yield stress in machine direction solely depends upon density and presents no significant difference between resins prepared from pure EBI, or pure THI or EBI/THI blends. It increases with increasing density. Yield stress in the transverse direction is more complex and depends additionally on MI2.

Figure 5:
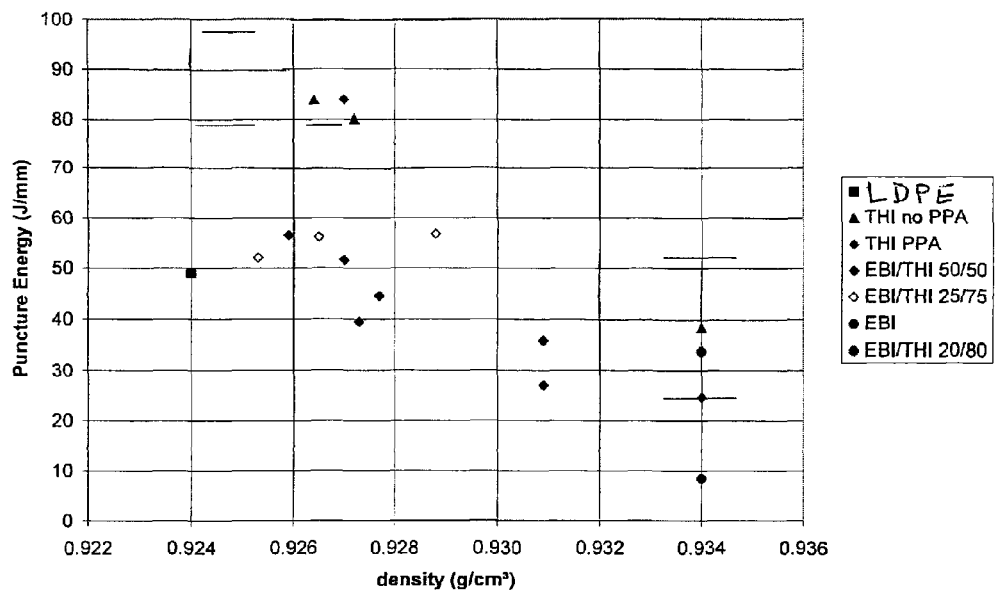
FIG. 5 represents the puncture energy expressed in J/mm as a function of pellets density expressed in g/cm³ for 40 μm Brabender films prepared with 2.5 blow-up ratio (BUR).

Slow puncture tests show that puncture energy increases with decreasing density. There is no significant difference between resins prepared from pure EBI or EBI/THI blends. Typical results are displayed in FIG. 5 representing the puncture energy as a function of density.

Figure 6:
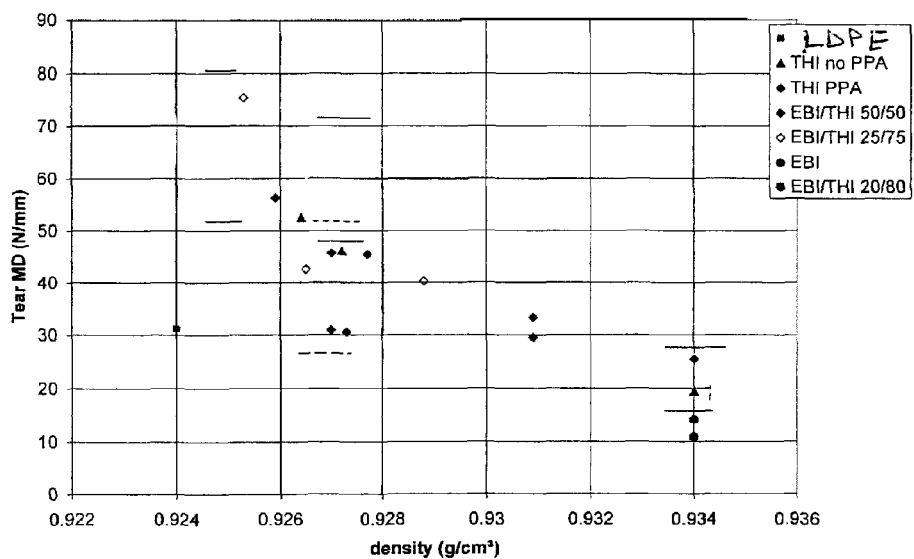
FIG. 6 represents the tear resistance in machine direction expressed in N/mm as a function of pellets density expressed in g/cm³ for 40 μm Brabender films prepared with 2.5 BUR.
Figure 7:
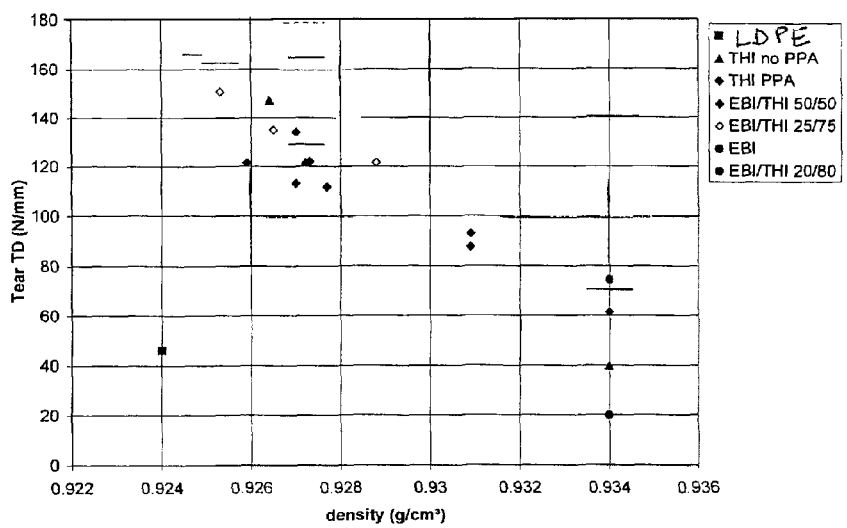
FIG. 7 represents the tear resistance in transverse direction expressed in N/mm as a function of pellets density expressed in g/cm³ for 40 μm Brabender films prepared with 2.5 BUR.

The Elmendorf tear resistance of the films prepared according to the present invention increases with decreasing density in both machine and transverse directions. It is in line with the good performances of pure THI resins and clearly outperforms the pure EBI resins. This can be seen on FIGS. 6 and 7 that represent respectively the Elmendorf tear resistance in machine and in transverse directions as a function of density for resins produced from pure EBI, or pure THI or several EBI/THI blends.

Figure 8:
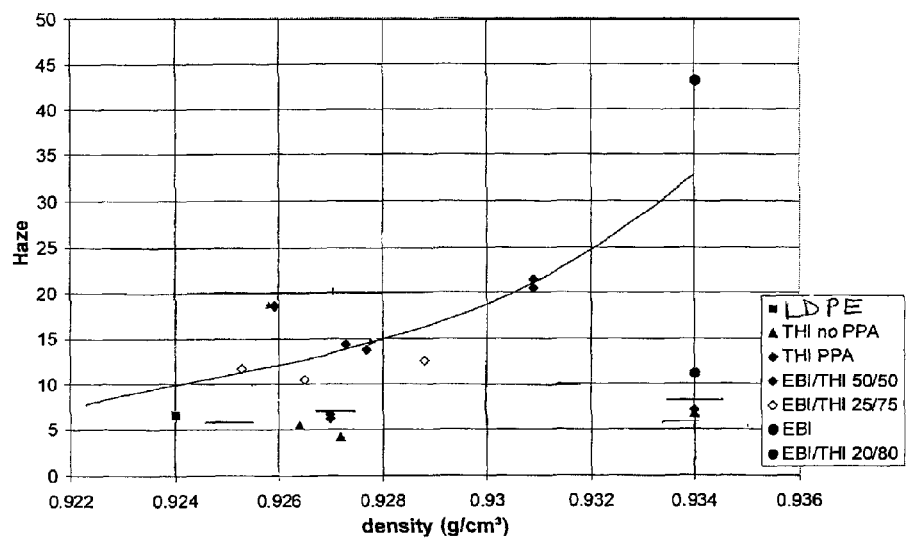
FIG. 8 represents haze, expressed in % as a function of pellets density expressed in g/cm³ for 40 μm Brabender films prepared with 2.5 BUR.

The haze values of films prepared with the blend of catalytic components of the present invention are substantially improved when compared to films prepared with pure EBI-based catalyst systems. They are very close to the excellent optical properties of THI-based resins, although not quite as good as can be seen in FIG. 8.

EXAMPLES

All polymer properties were measured following the methods described herebelow.

The molar weight distributions were measured on Waters Alliance 2000 GPCV instruments with refractive index detection by size exclusion chromatography (SEC). Prior to analysis, the samples were kept at a temperature of 160° C. for a period of time of 1 hour without stirring. 300 µl of filtered sample were injected in the apparatus. Two Shodex AT-806MS (Showa Denko) and one Styragel HT6E (Waters) columns were used with a flow rate of 1 ml/min. Analyses were carried out at a temperature of 145° C. in 1,2,4-trichlorobenzene (TCB), BAKER 8430 (minimum 99%), stabilised with 1 g/l of butylated hydroxytoluene (BHT). The polymer solution concentration, measured at room temperature, was of 1 mg/ml.

The calibration was based on narrow polystyrene standards.

The calibration curve was fitted using a third order polynomial:

$$\log(Mp) = At^3 + Bt^2 + Ct + D.$$

wherein Mp is the molecular weight at the distribution peak as announced in the certificate and t is the time expressed in seconds.

Using this calibration curve, the molecular weights obtained after integration were based on polystyrene. Each measured data point was converted from PS to PE, using the relationship:

$$\log(Mp[PE]) = A \log(MP[PS]) + B$$

wherein A=0.965909 and B=−0.282638.

Data treatment was performed using the Empower software (Waters).

Long chain branching was determined by SEC-VISCO. The measurements were conducted on a GPCV-200 instrument from Waters. The apparatus was composed of a set of three columns (two Shodex AT-806MS from Showa Denko and one Styragel HT6E from Waters), an injector maintained at a temperature of 145° C., and a circulating pump. The PE was dissolved in filtered 1,2,4-trichlorobenzene (TCB) stabilised with 1 g/l of BHT at a concentration of 0.1% at room temperature, followed by heating to a temperature of 150° C. without stirring. The solution was then filtered on a 0.5 µm mesh size filter using Polymer Laboratories PL-SP260 apparatus. About 400 µl of the filtered solution were injected in the columns at a flow rate of 1 ml/min and the eluted solution passed through two detectors: a differential refractometer and a viscometer. The parameter g' was calculated for each eluted fraction with Empower software using equation $$g'_i = \frac{[\eta]_{i,branched}}{K(M_i)^\alpha} = \frac{[\eta]_{i,branched}}{[\eta]_{i,linear}}$$

wherein $g'_i$ is the ratio of intrinsic viscosity of the branched PE measured with on-line viscometer to the intrinsic viscosity of a linear PE eluted at the same $i^{th}$ elution volume and wherein K=4.167 $10^{-4}$ dl/g and α=0.72. The molecular weight of linear PE is calculated with the universal calibration method wherein K=1.035 $10^{-4}$ dl/g and α=0.72 for PS narrow molecular weight distribution (MWD) standards.

A curve of $g'_i$ versus $M_i$ can thus be obtained for all eluted fractions. Parameter g' is the weight average value of all $g'_i$ wherein weight fraction $w_i$ of PE is detected with a differential refractometer.

$$g' = \frac{\sum_i w_i g'_i}{\sum_i w_i}$$

From g', the number of long chain branching per 10000 carbon atoms, LCB/10000 C, was derived using simplifying hypotheses:
- trifunctional branch points;
- random distribution of branch lengths;
- uniform number of branches per molecule.

This is explained for example in Mirabella and Wild (F. M. Mirabella and L. Wild, 'Determination of Long-Chain Branching Distributions of Polyethylenes', in 'Polymer Characterization', Amer. Chem. Soc. Symp. Series 227, 23, 1990).

Long chain branching was also determined by rheology using any one of the four following methods.

Method 1.

DRI (Dow Rheology Index) was introduced by S. Lai and G. W. Knight (ANTEC '93 Proceedings, Insite™ Technology Polyolefins (ITP)—New Rules in the Structure/Rheology Relationship of Ethylene &-Olefin Copolymers, New Orleans, La., May 1993; Antec '94, Dow Rheology Index (DRI) for Insite™ Technology Polyolefins (ITP): Unique structure-Processing Relationships, pp. 1814-1815)) to quantify LCB in what they called substantially linear polyolefins (EP0608369 B1, U.S. Pat. No. 5,665,800). These authors defined the Dow Rheology Index (DRI) as a new rheological measurement, which expressed a polymer's "normalised" relaxation time as the result of long chain branching. It was shown that a low value of the Dow rheological index is indicative of low or inexistant LCB. DRI is equal to 0 for linear mPE. DRI is not suitable to quantify LCB in PE resins with polydispersity index (PI) larger than 4. PI is defined as the ratio $M_w/M_n$ of the weight average molecular weight Mw over the number average molecular weight Mn.

Method 2.

LOBI introduced by Shroff and Mavridis (R. N. Shroff and H. Mavridis, Macromolecules, 32, 8454 (1999)) was defined as the ratio of intrinsic viscosities of PE resins estimated by rheology to that determined via solution techniques.

$$LCBI = \frac{[\eta]_{rheo}}{[\eta]_{sol}} - 1$$

wherein $[\eta]_{rheo}$ and $[\eta]_{sol}$ are the intrinsic viscosities obtained respectively from rheology or via solution.

Thus, LOBI is zero for linear samples and it is lager than zero for polyethylene containing long chain branching. Values of LOBI larger than 0.8 are typically associated with a high level of LCB. Intrinsic viscosity values, expressed in dl/g, were calculated, in the present invention, via solution in terms of weight average molecular weight Mw, expressed in Da, obtained by size exclusion chromatography with equation $$[\eta]_{sol} = 5.25 * 10^{-4} (M_w)^{0.76}$$

Intrinsic viscosity was also inferred by rheology, using Mw inferred from zero shear viscosity. Indeed, zero shear viscosity $\eta_0$, expressed in Pa·s, is also related to the weight average molecular weight $M_w$, expressed in Da, by equation $$\eta_0 = 4.4927 * 10^{-16} (M_w)^{3.8412}$$

This equation was derived from 50 linear PE samples prepared both with metallocene and Ziegler-Natta catalyst systems. PE samples had a weight average molecular weight Mw ranging from 30 to 700 kDa, a polydispersity index PI ranging from 2 to 25 and a density ranging from 0.870 to 0.965 g/cm³.

Zero shear viscosity ($\eta_0$) was estimated by fitting with Carreau-Yasuda flow curve obtained at a temperature of 190° C., by oscillatory shear rheology on ARES equipment (manufactured by TA Instruments) in the linear viscoelasticity domain. Circular frequency W expressed in rad/s varied from 0.05-0.1 rad/s to 250-500 rad/s with a shear strain typically of 10%.

The LCBI can also be rewritten as $$LCBI = \frac{0.572 * (\eta_0)^{0.1979}}{5.25 * 10^{-4}(M_w)^{0.76}} - 1$$

Method 3.

LCB concentration was also inferred from zero shear viscosity values, at a temperature of 190° C. using Colby and Janzen's equation [J. Janzen and R. H. Colby, J. Mol. Struct. 485-486, 569 (1999)] that gives two solutions for LCB concentration: a solution for PE resins with sparse LCB and a solution for high concentration of LCB, typically for LDPE.

Method 4.

LCB concentration was determined indirectly, through its effect on enhancement of zero-shear viscosity. This method is particularly suitable when LCB concentration is too low to be detected by conventional techniques. The enhancement of zero shear viscosity by LCB was expressed by equation.

$$g_{rheo}(PE) = \frac{M_w(SEC)}{M_w(\eta_0, MWD, SCB)}$$

wherein $g_{rheo}$ is equal to one for linear PE and decreases with increasing amount of LCB.

reactivities of these two catalyst systems, the ratio of THI to EBI catalyst components was of 65 to 35. The polyethylene was prepared in a double loop reactor under monomodal configuration.

The fluffs were extruded with 1500 ppm of B215 (an anti-oxidant package sold by Ciba that contains 2 parts of phosphite Irgafos 168 and one part phenolic anti-oxidant Irganox 1010) on twin-screw laboratory extruder Brabender TSE20/40 under nitrogen blanketing at 80 or 90 RPM with the following temperature profile: 210, 215, 220, 220, 215° C. The selected screw profile was selected for best dispersion mixing. Torque, temperature and die pressure were recorded during extrusion. The pellets were then used to characterise processing by measuring melt strength versus extruder head pressure. They were also used to prepare blown films on a single-screw Brabender extruder. For determination of the processing behaviour, the instrumented laboratory extruder was equipped with a single screw (L/D 25, D 19 mm, compression ratio 4) and a melt pump with a closed-loop pressure control was inserted before the die. Blown films were produced with the same type of single screw extruder using an annular die with 25 mm diameter and 0.5 mm die gap. All films were produced with a blow-up ratio (BUR) of 2.5 and a thickness of about 40 μm. In order to benchmark properties of blown films and for comparison purpose in the processing characterisation several commercial resins have been included. In all the extrusion works and in the various rheological characterisations, resins with polymer processing aids (PPA) were also investigated.

The characteristics of the polyethylene pellets from six different runs R1 to R6 are summarized in Table I as well as those of pellets produced from pure THI and from pure EBI.

TABLE I

| Resin | MI2 (dg/min) | HLMI (dg/min) | Density (g/cm³) | Mn kDa | Mw kDa | D | $g_{rheo}$ | g' | LCBI |
|---|---|---|---|---|---|---|---|---|---|
| EBI | 0.55 | 29.7 | 0.934 | 23.5 | 130 | 5.53 | 0.68 | 0.64 | 0.50 |
| THI | 0.88 | 27.1 | 0.934 | 31.6 | 87.7 | 2.78 | 0.58 | 1 | |
| R1 | 0.76 | 35.4 | 0.931 | 30.3 | 97.6 | 3.22 | 0.44 | 0.89 | 1.37 |
| R2 | 0.90 | 39.8 | 0.931 | 26.3 | 92 | 3.5 | 0.46 | 0.9 | 1.45 |
| R3 | 0.72 | 34.0 | 0.928 | — | — | — | — | — | — |
| R4 | 0.68 | 31.1 | 0.926 | 28.4 | 102 | 3.59 | 0.51 | 0.94 | 1.25 |
| R5 | 1.31 | 48.7 | 0.927 | 27.7 | 87.7 | 3.17 | 0.55 | 0.91 | |
| R6 | 1.67 | 57.1 | 0.927 | 24.3 | 79.4 | 3.27 | 0.56 | 0.85 | 0.95 |

Significant improvement in zero shear viscosity prediction as function of the weight average molecular weight Mw was obtained by including the effects of short chain branching (SCB) and molecular weight distribution. Mw was thus determined from measurement of $\eta_0$, and included the effects of Mz, Mn and density. It was observed that, with method 2, the resin density had an impact on the value of LOBI: LOBI increased with decreasing resin density. Such influence was not observed with present method 4. The presence of LCB can be detected with $g_{rheo}$ for lower LCB concentration than with all the other methods. Values of $g_{rheo}$ below 0.95 indicate the presence of LCB. For PI larger than 15 and for high Mw, the detection of LCB becomes less accurate with all approaches that use zero shear viscosity.

Several blends of EBI and THI catalyst components were prepared. The target resin was a 50/50 ratio of EBI and THI polyethylenes. For that purpose, and because of the different The molecular weight distribution of the pure EBI resin and that of resin R4 are represented in FIG. 1. Resin R4 has a polydispersity index D of 3.6 as compared to D of 5.5 for pure EBI resin and it can be seen that the high molecular weight shoulder has disappeared and that the low molecular weight tail has been reduced in resin R4 when compared to pure EBI resin.

The melt flow indices MI2 and HLMI of EBI/THI fluffs strongly decrease between reactor 1 and reactor 2 while SR increases. This change cannot be attributed to a change in molecular weight as can be seen in Tables II and III respectively for reactors 1 and 2. The short chain branches (SCB) content is also constant confirming that the double loop reactors were operated in monomodal configuration. A strong drop of $g_{rheo}$ index between reactor 1 and reactor 2, indicating an increase of LCB content, was also observed. Such behaviour is surprising and unique.

TABLE II

Reactor 1.

| Resin | Mn (kDa) | Mw (kDa) | $g_{rheo}$ | SCB/1000 C. |
|---|---|---|---|---|
| R2 | 25.2 | 91.5 | 0.49 | 7 |
| R4 | 24.5 | 87 | 0.52 | 8 |
| R6 | 26 | 76 | 0.68 | 8 |

TABLE III

Reactor 2.

| Resin | Mn (kDa) | Mw (kDa) | $g_{rheo}$ | SCB/1000 C. |
|---|---|---|---|---|
| R2 | 27.1 | 91.7 | 0.3 | 9 |
| R4 | 29.1 | 104 | 0.29 | 7 |
| R6 | 25.5 | 83 | 0.46 | 10 |

Pellets from the fluff resins of Table II were also analysed by RDA. It was observed that shear viscosity at low shear rates decreased, indicating chain disentanglement, as only negligible change in Mw and MWD were detected by GPC.

Blown films were prepared as described hereabove from

EBI/THI resin blends R1 to R6;

pure EBI resin;

pure THI resin;

resin R7, a 50/50 physical blend of R2 and commercial THI M2710 (density=0.927 g/cm³ and MI2=1 dg/min), resin R8 a 50/50 physical blend of R4 and commercial THI M2704 (density=0.927 g/cm³ and MI2=0.4 dg/min);

resin R9, a 50/50 physical blend of R4 and commercial THI M2307 (density=0.923 g/cm³ and MI2=0.7 dg/min).

Resins R7 to R9 have a ratio of THI/EBI polyethylenes of 75 to 25.

Their optical and mechanical properties are summarized in Table IV for haze and for tear properties in machine and transverse directions and in Table V for tensile properties in machine and transverse directions and for slow puncture properties. Haze is represented in FIG. 8 as a function of density for the resins of the invention and for several comparative resins.

TABLE IV

| Resin | Density g/cm³ | MI2 dg/min | HLMI dg/min | Haze % | Tear M N/mm | Tear T N/mm |
|---|---|---|---|---|---|---|
| R1 | 0.931 | 0.76 | 35.4 | 21.5 | 33.4 | 87.5 |
| R2 | 0.931 | 0.9 | 44.2 | 20.5 | 29.6 | 92.9 |
| R3 | 0.928 | 0.72 | 34 | — | — | — |
| R4 | 0.926 | 0.68 | 31.1 | 18.5 | 56.3 | 121.5 |
| R5 | 0.927 | 1.31 | 48.7 | 14.3 | 30.6 | 122.1 |
| R6 | 0.928 | 1.67 | 57.1 | 13.7 | 45.3 | 111.8 |
| R7 | 0.929 | 1.02 | 32.4 | 12.5 | 40.3 | 121.6 |
| R8 | 0.927 | 0.47 | 18.7 | 10.5 | 42.6 | 135.0 |
| R9 | 0.925 | 0.8 | 28 | 11.7 | 75.4 | 150.6 |
| EBI | 0.934 | 0.55 | 29.7 | 43.2 | 10.9 | 19.9 |
| THI | 0.934 | 0.9 | 27.1 | 7.1 | 25.6 | 61.4 |

Tear M and T represent respectively the Elmendorf tear resistance in machine and transverse directions.

TABLE V

| | Tensile M | | | Tensile T | | | |
|---|---|---|---|---|---|---|---|
| Resin | $\sigma_y{}^a$ MPa | UTS[b] MPa | Strain at break % | $\sigma_y$ MPa | UTS MPa | Strain at break % | Puncture J/mm |
| R1 | 14.29 | 34.05 | 608 | 13.07 | 34.97 | 657 | 35.8 |
| R2 | 14.79 | 40.44 | 680 | 10.81 | 28.09 | 558 | 27.1 |
| R4 | 13.4 | 36.73 | 597 | 12.21 | 39.45 | 620 | 56.6 |
| R5 | 13.91 | 37.51 | 678 | 11.79 | 29.79 | 569 | 39.5 |
| R6 | 13.79 | 24.16 | 480 | 10.74 | 20.92 | 467 | 44.5 |
| R7 | 14.62 | 41.42 | 669 | 15.13 | 45.72 | 691 | 56.9 |
| R8 | 12.54 | 43.46 | 607 | 12.63 | 40.61 | 593 | 56.2 |
| R9 | 12.47 | 39.28 | 640 | 12.23 | 45.91 | 610 | 52.1 |
| EBI | 19.19 | 36.41 | 753 | 17.93 | 36.47 | 607 | 8.5 |
| THI | 16.91 | 39.78 | 676 | 15.68 | 42.42 | 643 | 24.7 |

[a]$\sigma_y$ is the yield Stress:
[b]UTS is the ultimate tensile strength

The resins of the present invention are easier to process than pure THI resins but not quite as good as pure EBI resins. Processing improvement is qualified by less specific energy and less extruder head pressure at a given melt strength and by better bubble stability in film formation. Said improvement increases linearly with EBI content for amounts of EBI-produced polyethylene (EBIPE) of up to 50 wt % and then saturates for amounts of EBIPE larger than 50 wt %. Processing can be comparable to that of commercial THI resins with polymer processing aid (PPA).

Haze decreases with decreasing density, said decrease being higher for higher EBI content.

The best compromise of haze and processing is obtained with EBI/THI resins having a ratio of THIPE/EBIPE of about 50/50, densities ranging between 0.920 and 0.924 g/cm³ and MI2 values ranging between 0.3 and 0.7 dg/min Machine and transverse Elmendorf tear, tensile properties such as yield stress, ultimate tensile strength, and strain at break, in both directions, as well as puncture resistance are comparable to those obtained on commercial THI resins having a density of about 0.930 g/cm³.

The invention claimed is:

1. A process for preparing a polyethylene resin in a double loop reactor comprising:

injecting into a first reactor an activated supported catalyst system, wherein the catalyst system comprises from 25 to 55 wt. % of a first bisindenyl catalyst component and from 45 to 75 wt % of a second bistetrahydroindenyl catalyst component;

injecting ethylene monomer and optional comonomer into the first reactor simultaneously with or after the catalyst system;

maintaining under polymerisation conditions in the first reactor;

transferring the catalyst system and polymer into a second reactor and injecting fresh monomer and the same optional comonomer;

maintaining in the second reactor the same polymerisation conditions as in the first reactor; and retrieving a polyethylene resin from the second reactor, wherein a level of long chain branches increases when passing from the first to the second reactor.

2. The process of claim 1, wherein the bis-indenyl catalyst component is represented by formula I

$$R''(Ind)_2MQ_2 \qquad (I)$$

wherein Ind is substituted or unsubstituted indenyl; R'' is a structural bridge between the two indenyls to impart stereorigidity that comprises a $C_1$-$C_4$ alkylene radical, a dialkyl germanium or silicon or siloxane, or a alkyl phosphine or amine radical, which bridge is substituted or unsubstituted; M is a metal Group 4 of the Periodic Table; and Q is hydrogen, halogen, hydrocarbyl or hydrocarboxyl.

3. The process of claim 2, wherein the bis-tetrahydroindenyl catalyst component is $$R''(H_4Ind)_2MQ_2$$

wherein ($H_4$Ind) is a hydrogenated indenyl group substituted or unsubstituted.

4. The process of claim 2, wherein each substituent on the indenyl or on the terahydroindenyl groups may be independently selected from formula $XR_v$ in which X is chosen from group IVA, oxygen and nitrogen and each R is the same or different and chosen from hydrogen or hydrocarbyl of from 1 to 20 carbon atoms and v+1 is the valence of X.

5. The process of claim 4, wherein the substituents on the indenyl or tetrahydroindenyl groups, if present, are in positions 2 and/or position 4 with a methyl group, at position 2 and t-butyl group or phenyl group, at position 4.

6. The process of claim 2, wherein the structural bridge is a $C_1$-$C_4$ alkylene radical selected from $Me_2C$, $Ph_2C$ or a silyl bridge.

7. The process of claim 2, wherein M is selected from Zr, Ti, Hf or V.

8. The process of claim 2, wherein both Q are the same and are halogen.

9. The process of claim 1, wherein the amount of each catalyst component is selected to give a ratio of bis-indenyl polyethylene to bis-tetrahydroindenyl polyethylene of about 50/50 by weight.

* * * * *